United States Patent [19]

Löbel

[11] Patent Number: 4,932,924
[45] Date of Patent: Jun. 12, 1990

[54] TORQUE TRANSMITTING ASSEMBLY
[75] Inventor: Wolfgang Löbel, Frankfurt am Main, Fed. Rep. of Germany
[73] Assignee: Löhr & Bromkamp GmbH, Offenbach, Fed. Rep. of Germany
[21] Appl. No.: 226,626
[22] Filed: Aug. 1, 1988
[30] Foreign Application Priority Data
Aug. 5, 1987 [DE] Fed. Rep. of Germany ....... 3725959
[51] Int. Cl.⁵ .......................... F16C 3/02; F16D 1/02
[52] U.S. Cl. ...................................... 464/181; 464/30; 464/183
[58] Field of Search .................. 464/181, 182, 183, 30
[56] References Cited
U.S. PATENT DOCUMENTS

| 4,451,245 | 5/1984 | Hörnig et al. ...................... 464/181 |
| 4,605,385 | 8/1986 | Pück et al. .......................... 464/181 |
| 4,663,819 | 5/1987 | Traylor ............................ 464/181 X |
| 4,722,717 | 2/1988 | Salzman et al. ...................... 464/181 |

FOREIGN PATENT DOCUMENTS

| 0059163 | 9/1982 | European Pat. Off. . |
| 2716249 | 10/1977 | Fed. Rep. of Germany . |
| 3230116 | 2/1984 | Fed. Rep. of Germany ...... 464/181 |
| 54-52264 | 4/1979 | Japan .................................. 464/181 |

Primary Examiner—Daniel P. Stodola
Attorney, Agent, or Firm—Toren, McGeady & Associates

[57] ABSTRACT

An assembly for torque transmission, comprising a tube of fiber-reinforced plastics material and a metal spigot fitting within an end portion thereof, wherein the end portion of the tube in its free state has an internal diameter less than the external diameter of the spigot and has been pressed axially onto the spigot to produce a frictional connection. The end portion of the tube may be reinforced by being wound with fibres at a greater angle than the rest of the tube.

7 Claims, 2 Drawing Sheets

TORQUE TRANSMITTING ASSEMBLY

BACKGROUND TO THE INVENTION

1. Field of the Invention

This invention relates to an assembly wherein a connection for torque transmission is provided between a tube made of a fiber-reinforced plastics material and a metal spigot which fits within a portion of the tube. Such an assembly may form part of a drive shaft (e.g. a propeller shaft for a motor vehicle).

2. Description of Prior Art

One way in which such an assembly has been made is by winding fibers to form the tube directly onto the metal spigot. The spigot serves as part of the mandrel on which the fibers are wound to form the shaft. The plastics resin with which the fibers are impregnated tends to adhere to the spigot, but even so the assembly thus produced is not suitable for transmitting higher torques. It has been proposed to insert additional radially extending securing means such as pins or rivets into the overlapping spigot and tube portion, but these lead to high stress concentrations and weaken the tube material. It has also been proposed to provide the spigot with a surface configuration, e.g. with radial projections, such that when the tube fibers are wound thereon a form fitting connection is achieved. This, however, is also disadvantageous in that it results in stress concentrations, and has a production disadvantage because it makes the fiber winding process more complex.

It is the object of the present invention to provide an assembly for torque transmission wherein a connection between a tube of fiber-reinforced plastics material and a metal spigot fitting therein is achieved in a manner which is relatively easier to produce than those above described, and yet which can transmit relatively high torques.

SUMMARY OF THE INVENTION

According to the invention, we provide an assembly for torque transmission, comprising a tube of fiber-reinforced plastics material and a metal spigot fitting within a portion of the tube, wherein the portion of the tube in its free state has an internal diameter smaller than the external diameter of the spigot and has been assembled axially onto the spigot, to produce a frictional connection therebetween.

In contrast to the wound form-fitting connection above referred to, an assembly according to the invention is relatively easy to manufacture. The tube and the spigot can both be manufactured by cost effective production processes, without complications such as machining the spigot to give it a surface configuration for form-fitting fiber winding thereon. If the assembly according to the invention is overloaded, the purely frictional connection will simply slip but the parts thereof will not be destroyed. A safety function is thus fulfilled In an assembly according to the invention, the magnitude of the forces which are generated by fitting the tube onto the spigot is influenced by the direction in which the fibers extend in the tube. In order to achieve a high frictional force between the tube and spigot for torque transmission, the fibers should extend at relatively large angles relative to the length of the tube.

In particular, the portion of the tube in which the spigot fits preferably comprises fibers wound at an angle relative to the length of the tube of at least 75°, and preferably substantially 90°. The fibers at an angle of at least 75° may be provided in addition to fibers which extend along the entire length of the tube and are wound at a smaller angle, typically in the range 10° to 45°, to the longitudinal axis of the tube. The portion of the tube may comprise at least two overlapping parts having fibers wound at different angles. For example, the fibers wound at the smaller angle may be wound on the outside of the fibers wound at the large angle. A reversal of this arrangement, i.e. winding the additional fibers at a large angle onto the outside of an otherwise finished tube wound from fibers at lower angles is also possible to achieve the same effect. A tube whose wall comprises an additional part is well able to withstand forces arising as a result of its being forced onto the spigot.

Alternatively, the fibers wound at an angle of at least 75° in said portion of the tube may also extend throughout the rest of the tube wherein they are wound at a smaller angle. The portions of the tube with the fibers at different angles merge into one another smoothly; this is readily achieved in a computer controlled production facility for tube winding. Such a tube in that part of its length which does not fit onto the spigot has good torque transmitting characteristics due to its winding angle in the range 10° to 45°.

Preferably the difference between the external diameter of the spigot and the internal diameter of the portion of the tube in which it fits is between 0.2 and 0.7 mm, for shaft sizes with diameters in the range from 50 to 120 mm.

BRIEF DESCRIPTION OF DRAWINGS

The invention will now be described by way of example with reference to the accompanying drawings, of which.

DESCRIPTION OF PREFERRED EMBODIMENTS

Figure 1:
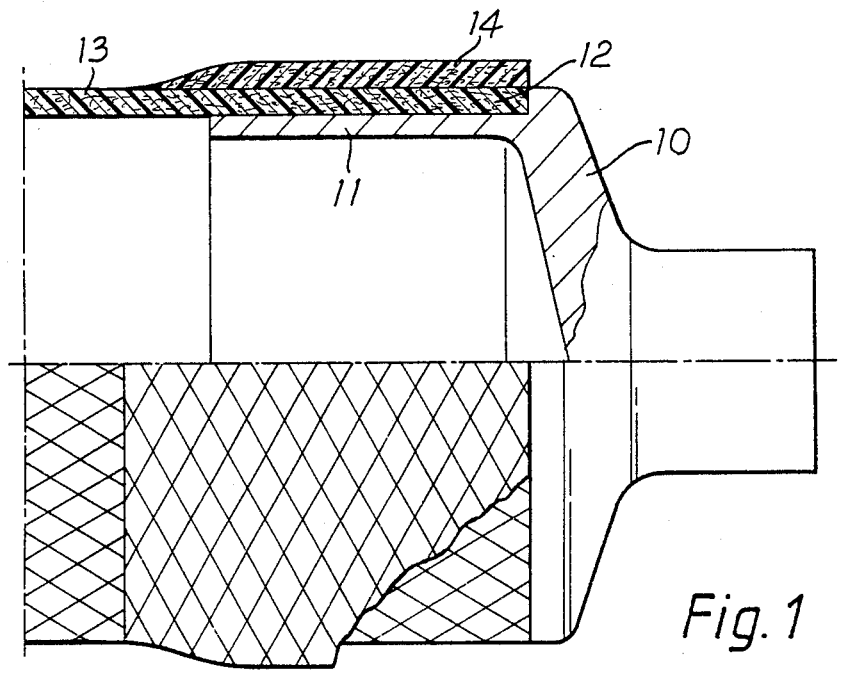
FIGS. 1, 2, 3 and 4 are partly sectioned elevations of different embodiments of assembly according to the invention.

Referring firstly to FIG. 1, there is shown a component 10 having a spigot 11 extending therefrom, the spigot having a cylindrical external circumferential surface. The component 10 may be a yoke member of a Hookes universal joint, or any other torque transmitting component in, for example, a drive shaft such as a motor vehicle propeller shaft. The spigot 11 fits within an end portion 12 of a tube 13 of composite, fiber-reinforced plastics, material. In the end portion 12 of the tube within which the spigot 11 fits, the tube is reinforced by an additional external overlapping wall part 14 also of fiber-reinforced plastics material.

The assembly is manufactured by forcing the end portion 12 of the tube 13 axially over the spigot 11. The tube 13 is made by a fiber winding process as is generally well known, so that its free internal diameter is slightly less than the external diameter of the spigot 11, so that when these parts are assembled to one another the tube has to deform by expanding radially in its internal diameter. This causes establishment of forces giving a firm frictional connection able to transmit torque between the tube and spigot. By way of example, the difference between the diameters of the tube and spigot may be as above set forth. It will be appreciated that, depending on the relative moduli of elasticity of the tube and spigot, and their dimensions, the spigot will also be deformed to some extent in the assembly although this may be negligible compared with the deformation of the tube.

The tube 13 throughout its length is wound from fibers at an angle typically in the range 10° to 45° to the longitudinal axis of the tube, in both helical senses. The overlapping part 14 in the end portion of the tube is wound with fibers at a larger winding angle to the longitudinal axis of the tube, namely at least 75° and preferably up to substantially 90°.

Figure 2:
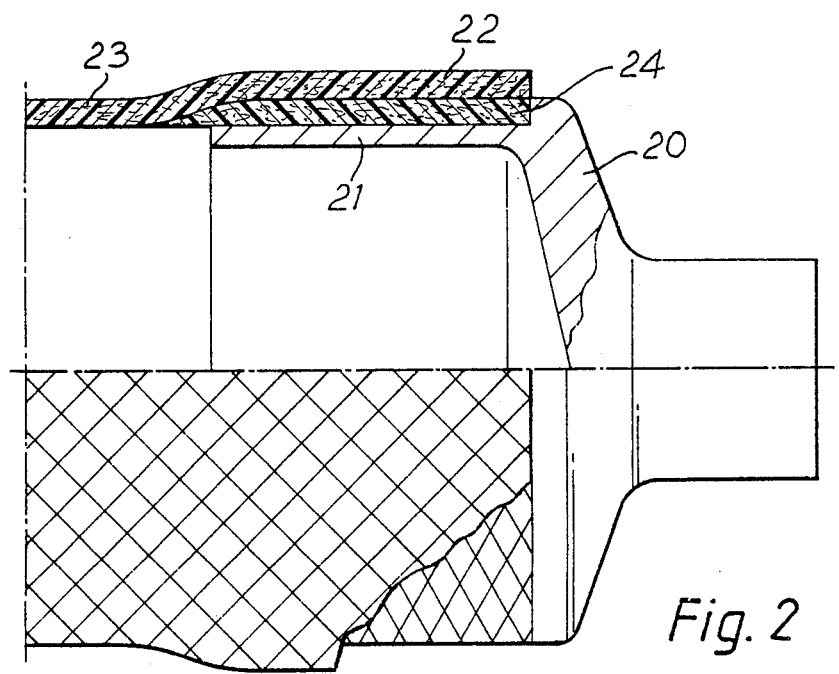

Referring now to FIG. 2, this shows a component 20 with spigot 21, the same as in the embodiment of FIG. 1. The spigot 21 fits within an end portion 22 of a tube 23 of fiber-reinforced plastics material. In this embodiment, however, the end portion 22 of the tube has an additional overlapping part 24 provided in its interior instead of on its exterior as in the embodiment of FIG. 1. As for the embodiment of FIG. 1, the part 24 is of fibers wound at a greater angle than the fibers which form the tube 23.

Figure 3:
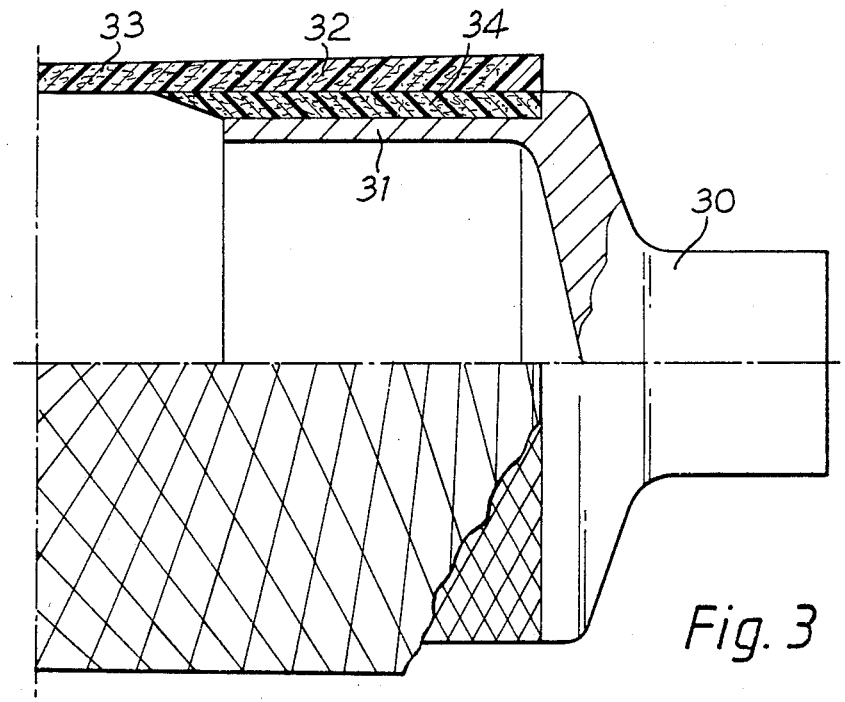

Referring now to FIG. 3, this embodiment has, as for the embodiment of FIG. 2, a component 30 with spigot 31 fitting within an end portion 32 of tube 33. Within the end portion 32 of the tube, there is an additional part 34 comprising fibers wound at a greater angle to the longitudinal axis of the tube. In this embodiment, however, in the tube end portion 32 the fibers thereof are wound at a progressively increasing angle to the longitudinal axis of the tube. There is a smooth progression in the winding angle of the fibers from the end portion of the tube where their angle is best able to resist the forces arising from fitting the tube end portion axially onto the spigot, to the rest of the tube where the winding angle is best able to transmit torque.

Figure 4:
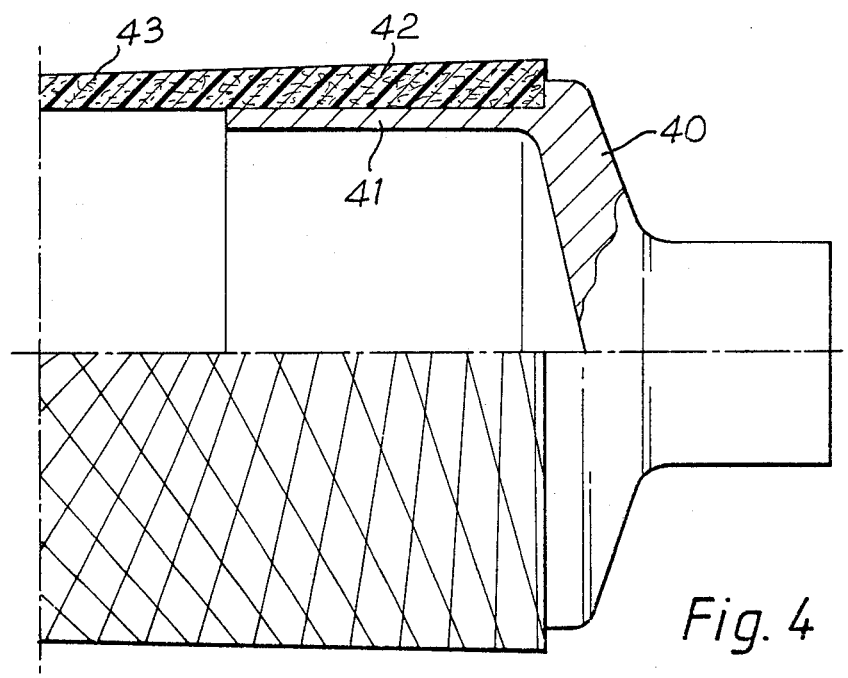

FIG. 4 shows a final embodiment of the invention, having a component 40 with spigot 41 fitting within an end portion 42 of a tube 43. In this embodiment, there is no separate layer of fibers reinforcing the end portion 42 of the tube. In such portion, the fibers are wound at an increasing angle and the wall thickness of the tube is correspondingly increased.

The assemblies shown in FIGS. 2 to 4 are manufactured in each case by forcing the tube end portion axially over the spigot, these components having a difference in their dimensions as above referred to so that a firm frictional connection is established therebetween.

I claim:

1. An assembly for torque transmission, comprising:
   a generally cylindrical tube of fiber-reinforced plastics material having at one end thereof a bore with an internal cylindrical surface, said one end of the tube comprising fibers wound at an angle relative to the length of the tube of at least 75°; and
   a metal spigot received in the bore and having an external cylindrical surface, the entire thickness of the material of said tube surrounding the bore being deformable in a radially outward direction by said spigot, when said spigot is forced into said bore, so as to provide a tight engagement between said internal and external surfaces, said tight engagement providing frictional forces between said internal and external surfaces that transmit torque up to a predetermined maximum and enable relative rotation therebetween for loads above said predetermined maximum.

2. An assembly according to claim 1 wherein said fibers at an angle of at least 75° in said portion of the tube are additional to fibers extending along the entire length of the tube and wound at an angle in the range 45° to 10°.

3. An assembly according to claim 1 wherein said fibers at an angle of at least 75° have, an angle of substantially 90°.

4. An assembly for torque transmission, comprising:
   a generally cylindrical tube of fiber-reinforced plastics material having at one end thereof a bore with an internal cylindrical surface, a portion of the tube at said one end including an additional part of fiber-reinforced plastics material which overlaps the tube proper, said part comprising fibers wound in an angle relative to the length of the tube of at least 75°; and
   a metal spigot received in the bore and having an external cylindrical surface, the entire thickness of the material of said tube surrounding the bore being deformable in a radially outward direction by said spigot, when said spigot is forced into said bore, so as to provide a tight engagement between said internal and external surfaces, said tight engagement providing frictional forces between said internal and external surfaces that transmit torque up to a predetermined maximum and enable relative rotation therebetween for loads above said predetermined maximum.

5. An assembly according to claim 4, wherein said additional part is disposed on the outside of the tube proper.

6. An assembly according to claim 4, wherein said additional part is disposed inside the tube proper and contains said bore.

7. An assembly according to claim 4, wherein said fibers extend from end to end of the tube and are wound at an angle relative to the length of the tube of at least 75° in said portion and are wound at lesser angles in parts of the tube intermediate the ends.

* * * * *